United States Patent
Liu et al.

(10) Patent No.: US 11,789,142 B2
(45) Date of Patent: Oct. 17, 2023

(54) GRAPH-BASED ARRAY SIGNAL DENOISING FOR PERTURBED SYNTHETIC APERTURE RADAR

(71) Applicant: Mitsubishi Electric Research Laboratories, Inc., Cambridge, MA (US)

(72) Inventors: Dehong Liu, Lexington, MA (US); Siheng Chen, Cambridge, MA (US); Petros Boufounos, Winchester, MA (US)

(73) Assignee: MITSUBISHI ELECTRIC RESEARCH LABORATORIES INC., Cambridge, MA (US)

( * ) Notice: Subject to any disclaimer, the term of this patent is extended or adjusted under 35 U.S.C. 154(b) by 204 days.

(21) Appl. No.: 16/898,673

(22) Filed: Jun. 11, 2020

(65) Prior Publication Data

US 2021/0389450 A1 Dec. 16, 2021

(51) Int. Cl.
*G01S 13/90* (2006.01)
*G01S 13/93* (2020.01)
(Continued)

(52) U.S. Cl.
CPC .......... *G01S 13/9011* (2013.01); *G01S 7/04* (2013.01); *G01S 13/9017* (2013.01);
(Continued)

(58) Field of Classification Search
CPC .... G01S 13/9011; G01S 7/04; G01S 13/9017; G01S 13/9043; G01S 13/931;
(Continued)

(56) References Cited

U.S. PATENT DOCUMENTS

| | | | |
|---|---|---|---|
| 10,310,074 B1* | 6/2019 | Ni | G01S 13/9019 |
| 2017/0146651 A1* | 5/2017 | Liu | G01S 13/89 |
| 2018/0059237 A1* | 3/2018 | Liu | G01S 13/89 |

* cited by examiner

*Primary Examiner* — Timothy A Brainard
*Assistant Examiner* — Juliana Cross
(74) *Attorney, Agent, or Firm* — Gennadiy Vinokur; Hironori Tsukamoto; LABORATORIES

(57) ABSTRACT

A radar image processing device is provided for generating a radar image from a region of interest (ROI). The radar image processing device receives transmitted radar pulses and radar echoes reflected from the ROI at different positions along a path of a moving radar platform and stores computer-executable programs including a range compressor, a graph modeling generator, a signal aligner, a radar imaging generator and a focused image generator. The radar image processing device performs range compression on the radar echoes by deconvolving the transmitted radar pulses and a radar measurement to obtain frequency-domain signals, generate a graph model represented by sequential positions of the moving radar platform and a graph shift matrix computed using the frequency-domain signals, iteratively denoise and align the frequency-domain signals to obtained denoised data and time shifts by solving a graph-based optimization problem represented by the graph model, wherein the approximated time shifts compensate phase misalignments caused by perturbed positions of the moving radar platform, and perform radar imaging based on the denoised data and the estimated time shifts to generate focused radar images.

20 Claims, 5 Drawing Sheets

(51) Int. Cl.
*G01S 7/04* (2006.01)
*G01S 13/931* (2020.01)
(52) U.S. Cl.
CPC ........ *G01S 13/9043* (2019.05); *G01S 13/931* (2013.01); *G01S 2013/93271* (2020.01)
(58) Field of Classification Search
CPC . G01S 2013/93271; G01S 2013/93274; G01S 13/9019; G01S 13/9041; G01S 13/9054
See application file for complete search history.

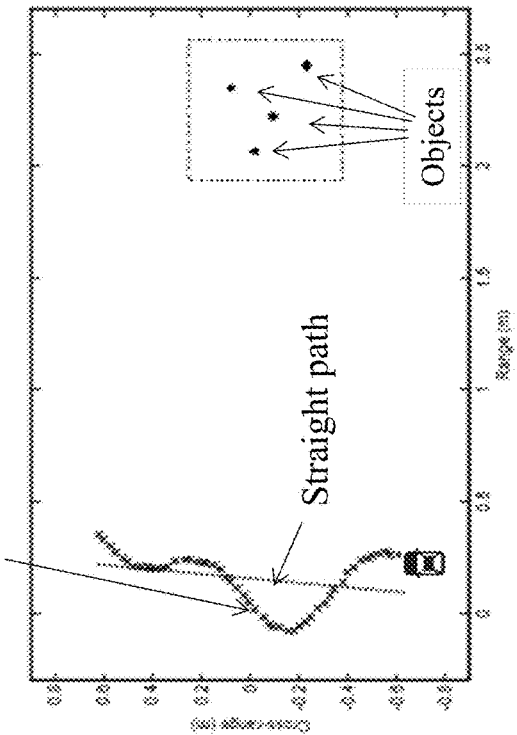
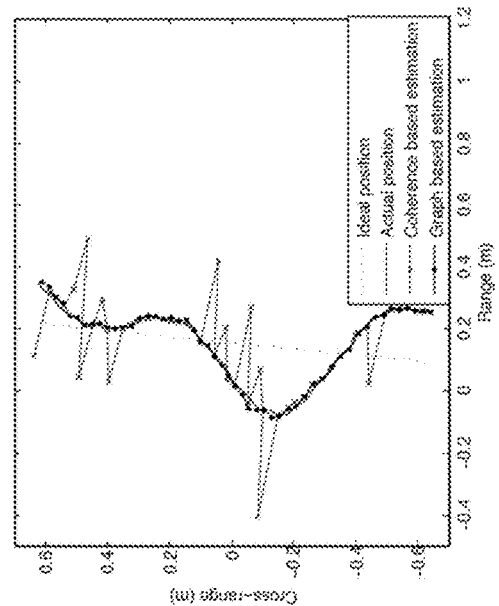
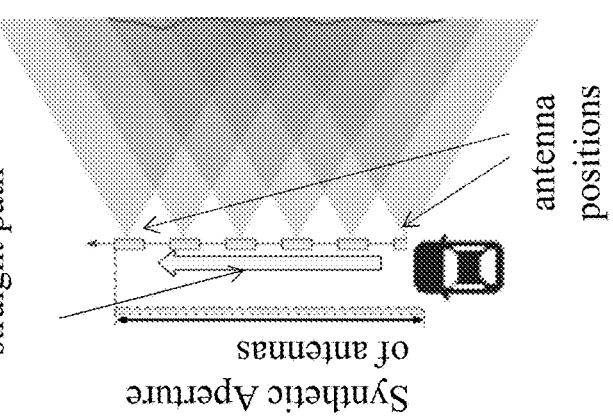
FIG. 1B
FIG. 1C
FIG. 1A

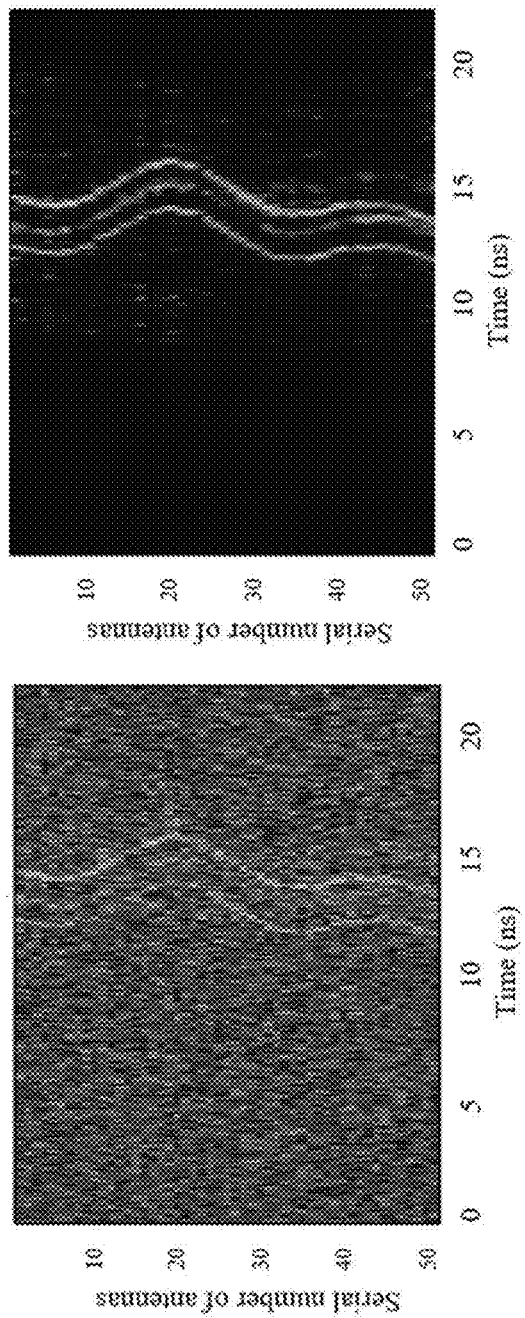
FIG. 3A
FIG. 3B
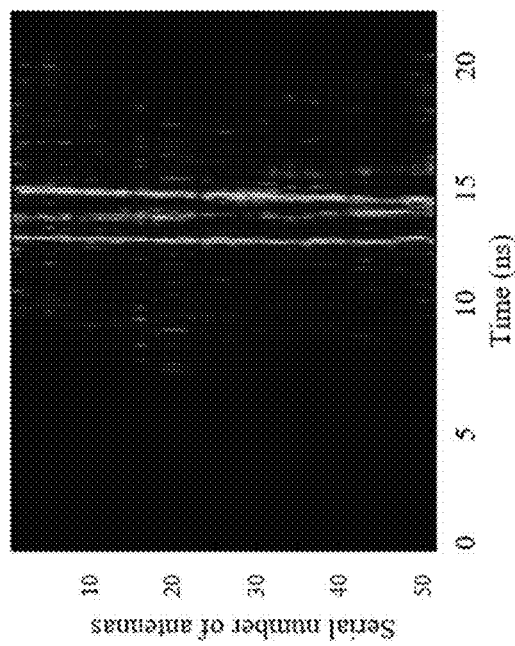
FIG. 3C

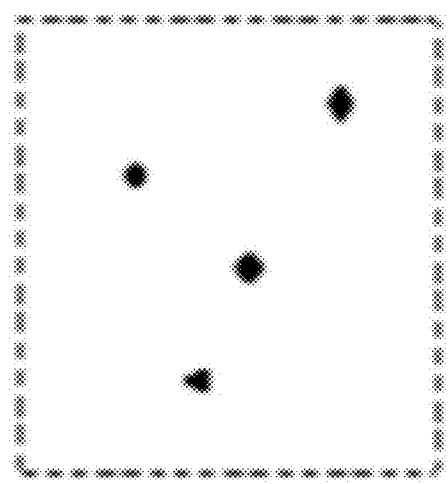
FIG. 4A
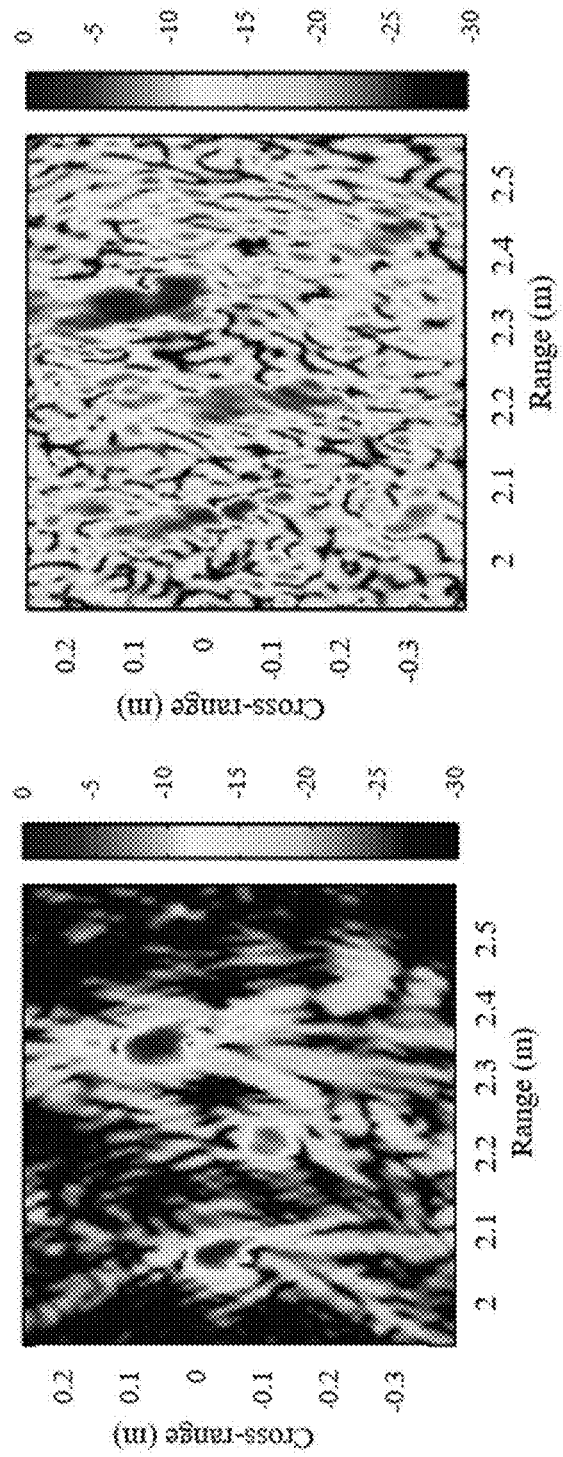
FIG. 4B
FIG. 4C

GRAPH-BASED ARRAY SIGNAL DENOISING FOR PERTURBED SYNTHETIC APERTURE RADAR

FIELD OF THE INVENTION

The present invention is related to a radar system, and more particularly to a moving radar system for generating a radar image of a region of interest from noisy radar measurements.

BACKGROUND & PRIOR ART

Automotive radar market keeps growing in recent years and is expected to grow dramatically in next few years. Compared to optical systems, automotive radar has the advantage of all-weather operation. However, its angular resolution is much lower than that of optical systems. In order to obtain high angular resolution, a large aperture size is needed for the conventional radar. A distributed synthetic aperture radar system forming a large virtual aperture is a possible solution to solve such trade-off, although position errors and timing errors of distributed sensor units degrade the sensing performance.

Accordingly, there is a need to develop a method which processes noisy signals collected by distributed sensor units mounted on automobiles based on a new compensation technique of position errors and timing errors.

SUMMARY OF THE INVENTION

The present disclosure relates to systems and methods for generating a radar image from a region of interest using a synthetic aperture radar system arranged on automobiles. Some embodiments of the present disclosure provide a method which processes signals from distributed sensor units of a synthetic aperture radar placed on automobiles with compensation technique of position errors and timing errors.

Some embodiments of the present disclosure understand that the performance of the synthetic aperture radar degrades when its moving platform is perturbed with unknown position errors or received signals are interfered by strong random noise. Therefore, it is desirable to perform robust imaging with noisy radar echoes even under large position perturbations. Some embodiments of the present disclosure propose a graph-based denoising method combining with robust perturbation estimation for processing noisy array signals received by a perturbed moving radar platform. Simulation results demonstrate that our method significantly improves SNR of array signals and imaging performance.

The performance of synthetic aperture radar degrades when its moving platform is perturbed with unknown position errors or the received signal is interfered by strong noise. Therefore, it is desirable to perform robust imaging with noisy radar echoes even under large position perturbations.

At least one realization of the present disclosure understands that a distributed radar system can be an advantageous solution to overcome technological challenges, if position errors and timing errors of the distributed sensor units are improved.

According to some embodiments of the present disclosure, a graph-based denoising method can be provided. The method includes combining with robust perturbation estimation for processing noisy array signals received by a perturbed moving radar platform. Simulation results demonstrate that our method significantly improves SNR of array signals and imaging performance.

Some embodiments of the present disclosure can provide a solution as to that the angular resolution of a radar using a distributed radar system can be improved by compensating the position errors and timing errors of the distributed sensor units.

In accordance with some embodiments of the present disclosure, a radar system for generating a radar image from a region of interest (ROI) can be provided. The radar system may include an interface configured to transmit radar pulses to the ROI at different positions along a path of a moving radar platform and receive radar echoes reflected from the ROI, wherein the at least one antenna is arranged on the moving platform to emit radar pulses to the ROI using at least one antenna; a memory configured to store computer-executable programs including a range compressor, a graph modeling generator, a signal aligner and a radar imaging generator and a focused image generator; a processor, in connection with the memory, configured to: perform range compression on the radar echoes by deconvolving the transmitted radar pulses with radar echoes to obtain frequency-domain signals $Y(i,k)$; generate a graph model represented by sequential positions of the moving radar platform and a graph shift matrix A computed using the frequency-domain signals $Y(i,k)$; iteratively align and denoise the frequency-domain signals $Y(i,k)$ to obtained time shifts $t_i$ for alignment and denoised data $X(i,k)$ by solving a graph-based optimization problem represented by the graph model, wherein the approximated time shifts $t_i$ are corresponding to position perturbations of the moving radar platform; and perform radar imaging based on the denoised data $X(i,k)$ and the estimated time shifts $t_i$ to generate focused radar images.

Further, yet another embodiment of the present disclosure can provide a radar image processing device for generating a radar image from a region of interest (ROI). The radar image processing device may include a network interface controller (NIC) configured to receive transmitted radar pulses and radar echoes reflected from the ROI in response to the transmitted radar pulses at different perturbed positions along a path of a moving radar platform; a memory configured to store computer-executable programs including a range compressor, a graph modeling generator, a signal aligner and a radar imaging generator and a focused image generator; a processor, in connection with the memory, configured to perform range compression on the radar echoes by deconvolving the transmitted radar pulses with radar echoes to obtain frequency-domain signals $Y(i,k)$; generate a graph model represented by sequential positions of the moving radar platform and a graph shift matrix A computed using the frequency-domain signals $Y(i,k)$; iteratively align and denoise the frequency-domain signals $Y(i,k)$ to obtain time shifts $t_i$ and denoised data $X(i,k)$ by solving a graph-based optimization problem represented by the graph model, wherein the approximated time shifts $t_i$ are corresponding to position perturbations of the moving radar platform; and perform radar imaging based on the denoised data $X(i,k)$ and the estimated time shifts $t_i$ to generate focused radar images.

BRIEF DESCRIPTION OF THE DRAWING

The accompanying drawings, which are included to provide a further understanding of the invention, illustrate embodiments of the invention and together with the description serve to explain the principle of the invention.

FIG. 1A shows a schematic illustrating a concept of a synthetic aperture of antennas;

FIG. 1B shows a simulation setup for radar data collection, according to embodiments of the present disclosure;

FIG. 1C shows actual perturbed radar positions and estimated positions, according to embodiments of the present disclosure;

FIGS. 3A, 3B and 3C show noisy and misaligned time-domain radar signal, denoised and misaligned time-domain radar signal, and denoised aligned time-domain radar signal respectively, according to embodiments of the present disclosure;

FIGS. 4A, 4B, and 4C show region of interest, radar imaging result of proposed method, radar imaging result of coherence analysis respectively, according to embodiments of the present disclosure.

DETAILED DESCRIPTION OF THE PREFERRED EMBODIMENTS

Figure 2:
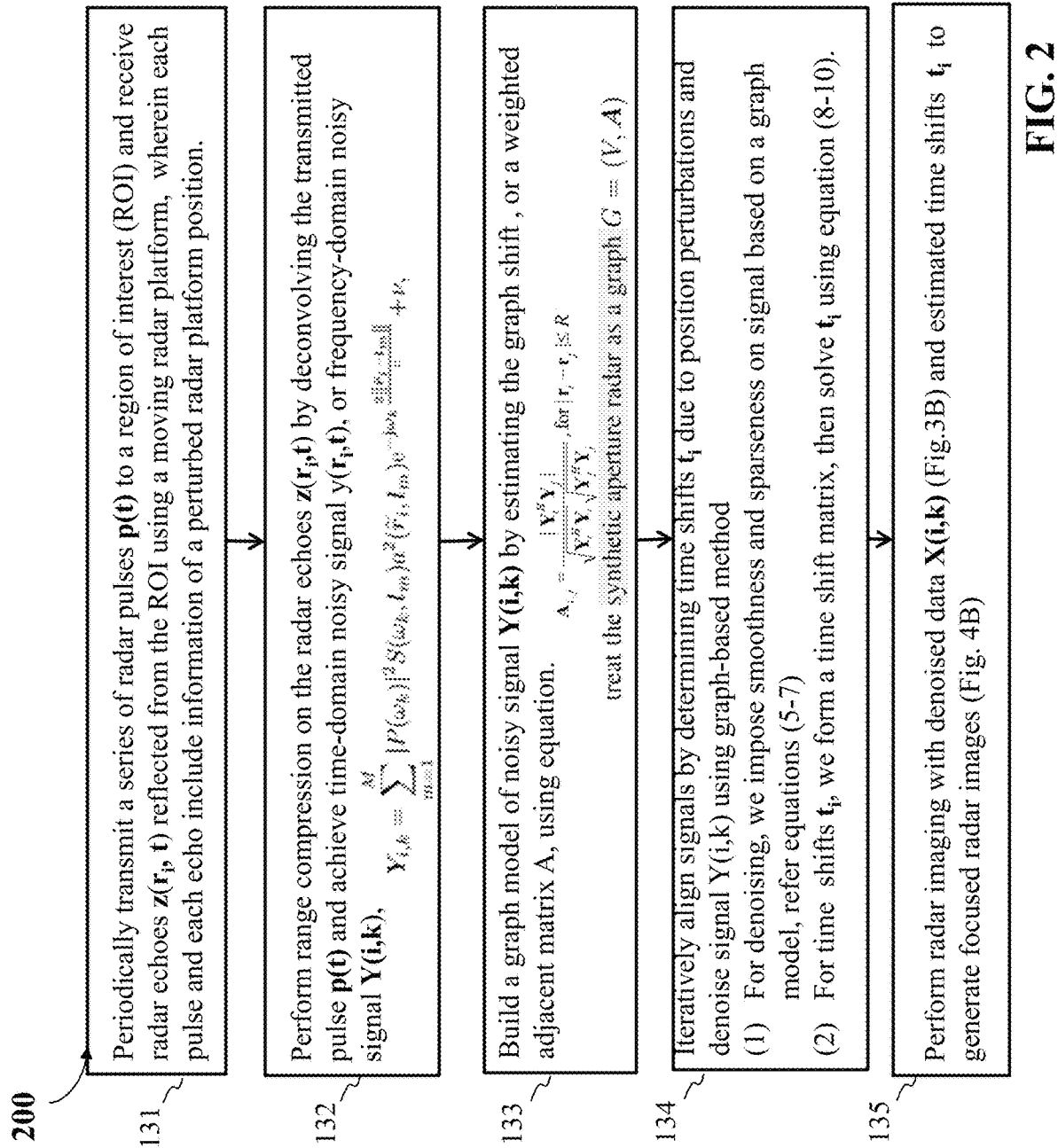
FIG. 2 shows a procedure for performing radar imaging, according to embodiments of the present disclosure.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

FIG. 1A is a schematic illustrating a concept of a synthetic aperture of antennas. The figure illustrates an example case where the synthetic aperture of antennas are configured to detect objects at side scenes while a car is moving forward on a road. However, this configuration is not limited to the side scenes. For instance, the synthetic aperture of antennas can be arranged to detect scenes at angles toward the advancing side of the car. In some case, the synthetic aperture of antennas disposed on the care may be referred to as a moving radar platform.

FIG. 2 shows a radar imaging method 200 for performing radar imaging, according to embodiments of the present disclosure. In this case, the method 200 can be data process steps 131, 132, 133, 134 and 135, which are performed by a processor (or processors) 120 in FIG. 5. The data process steps 131, 132, 133, 134 and 135 may be computer-executable programs 131, 132, 133, 134 and 135 stored in a storage 130 in FIG. 5, and the programs 131, 132, 133, 134 and 135 are performed by the processor 120 for the data process steps.

The data process 131 can be performed by periodically transmitting a series of radar pulses p(t) to a region of interest (ROI) and receiving radar echoes $z(r_i,t)$ reflected from the ROI using a moving radar platform. In this case, each pulse and its corresponding echo together include information of a perturbed radar platform position.

Next, the data process 132 may perform range compression on the radar echoes $z(r_i,t)$ by deconvolving the transmitted pulse p(t) and achieve time-domain noisy signal $y(r_i,t)$, or frequency-domain noisy signal $Y_{i,k}$=Y(i,k). For the $i^{th}$ radar position, $Y_i$=[Y(i,1), Y(i,2), Y(i,K)] is the frequency-domain measurement and $$y_i(t) = \sum_{k=1}^{K} Y_{i,k} e^{2\pi j \omega_k t}$$

is the time-domain measurement.

The data process 133 can build a graph model of noisy signal $Y_i$ by estimating the graph shift, or a weighted adjacent matrix A, using equation:

$$A_{i,j} = \frac{|Y_i^H Y_j|}{\sqrt{Y_i^H Y_i} \sqrt{Y_j^H Y_j}}, \text{ for } |r_i - r_j| \le R.$$

The data process 134 can iteratively denoise signal Y(i,k) using the graph-based method and align signals by determining time shifts $t_i$ due to position perturbations.

For denoising, the data process 134 imposes smoothness and sparseness on signal based on a graph model, refer equations (5-7). For time shifts $t_i$, the data process forms a time shift matrix, then solve $t_i$ using equations (8-10).

Further, the data process 135 can perform a radar imaging with denoised data X(i,k) and estimated time shifts $t_i$ to generate focused radar images.

Synthetic aperture radar uses a moving platform to form a large virtual aperture and consequently realizes high imaging resolution. However, in practice the performance of synthetic aperture radar degrades due to position perturbations of the moving radar platform and interferences to the radar echoes received by the platform. When the position perturbation level and the noise level are relatively low, one may analyze data coherence of received signals to correct phase errors caused by the perturbations or impose sparsity on the final radar image to realize auto-focused imaging. With the increase of perturbation and noise level, it becomes more and more challenging due to the nonconvexity of data coherence analysis. Imaging methods may be either time-consuming due to greedy search for unknown position errors, or perform poorly due to out-of-focus.

Graph signal processing (GSP) has been an active research topic in image and signal processing areas for years. GSP basically exploits the underlying specific data structure defined by the graphs to enhance signal or image quality. Recently, GSP has been applied to synthetic aperture radar to improve the imaging performance by modeling the final radar image as a graph where nodes are pixels of the radar image and edges are correlations between pixels. As a result, the radar image quality is enhanced with reduced noise. However, this image-based GSP cannot fundamentally solve the out-of-focus problem caused by radar position errors. Although the processed image is clean with fewer noise, its blurring imaging quality is still not good enough for further detection purpose. Therefore, it is desirable to perform robust imaging with noisy radar echoes even under large position perturbations.

At least one object of the present disclosure is to aim to improve the imaging performance of perturbed synthetic aperture radars using noisy radar echoes. To that end, we propose a graph-based array signal denoising method combining with a robust perturbation estimation. We treat the synthetic aperture radar system as graph, each transmitting and receiving position as a node of the graph, and the corresponding radar signal as the time-series associated with each node. To denoise the array signals, we formulate a graph-based objective function, which regularizes both the smoothness in the graph domain and the sparse gradients in the time domain. The main difference between our proposed method and the previous GSP-based method is that we build graph model in the radar signal domain instead of the image domain, such that we can jointly denoise signal and estimate position perturbations, providing focused imaging results. Preliminary experimental results show that the dual promotion significantly improves the denoising performance combining with a robust decomposition method to estimate the position perturbation.

Array Data Collection

We consider a 2D radar imaging problem for simplicity in which a mono-static moving radar platform is utilized to detect localized targets situated in a ROI. We use p(t) and P(ω) to denote the transmitted time-domain source pulse and its frequency spectrum respectively, where $$P(\omega) = \int_s p(t) e^{-j\omega t} dt \qquad (1)$$

Without loss of generality we assume there are up to M localized targets, each corresponds to a phase center located in the ROI. Let $I_m$ be the location of the $m^{th}$ target. Ideally, the mono-static radar performs as a uniform linear array, with the $i^{th}$ radar position located at $r_i$ for i=1, 2, ... N. Due to position perturbations, the actual measurements are taken at $\tilde{r}_i = r_i + \varepsilon_i$, where $\varepsilon_i$ stands for the unknown position perturbation of the $i^{th}$ radar position. The overall signal received by the perturbed array is then a superposition of scattered waves from all targets in the ROI. We consider measurements at discrete frequency $\omega_k$, where k=1, 2, ..., K. After range compression, we achieve the radar measurement in the frequency domain, an N×K data matrix Y=[$Y_{i,k}$] with $$Y_{i,k} = \sum_{m=1}^{M} |P(\omega_k)|^2 S(\omega_k, l_m) a^2(\tilde{r}_i, l_m) e^{-j\omega_k \frac{2\|\tilde{r}_i - l_m\|}{a}} + v, \qquad (2)$$

where $S(\omega_k, l_m)$ is a complex-valued function of frequency $\omega_k$ and it accounts for scattering strength of the $m^{th}$ target located at $l_m$; $a^2(\tilde{r}_i, l_m)$ accounts for the overall magnitude attenuation caused by the antenna beam-pattern and the propagation between $r_i$ and $l_m$; $e^{-j\omega k \|r_i - l_m\|/c}$ is the phase change term of the received signal relative to the source pulse; and v is the overall noise. Correspondingly, $Y_i$=[Y(i,1), Y(i,2), ... Y(i,K)] is the frequency-domain measurement and $$y_i(t) = \sum_{k=1}^{K} Y_{i,k} e^{2\pi j \omega_k t}$$

is the time-domain measurement, both associated with the $i^{th}$ radar position.

Note that in applications of radar target detection, radar measurements have distinct properties: slow transition in the frequency domain and sparse gradients in the time domain. The physical mechanism is as follows. Since both the scattering strength of targets and the antenna beam-pattern change gradually in the spatial domain, the scattered electromagnetic field of ROI will also be smooth in the spatial domain. When there are several isolated targets located in the ROI, each target will generate a response or signature to radar excitation. Therefore, the time-domain gradient of radar measurement at each position will be sparse, and the sparsity level is related to the total number of targets.

Graph-Based Denoising

To reduce the influence of noise and position perturbations, we treat the synthetic aperture radar as a graph G=(V, A), where V={$v_1, \ldots, v_i, \ldots v_j, \ldots v_N$} is the set of nodes, represented by sequential positions of the moving radar platform, and A ε $\mathcal{R}^{N \times N}$ is the graph shift, or a weighted adjacency matrix that represents the pairwise proximity between nodes, radar signal $Y_i$ ε $\mathcal{C}^K$ is then the noisy time-series associated with the $i^{th}$ node of the graph. We can estimate the graph shift through the radar measurements after range compression as $$A_{i,j} = \frac{|Y_i^H Y_j|}{\sqrt{Y_i^H Y_i} \sqrt{Y_j^H Y_j}}, \text{ for } |r_i - r_j| \le R \qquad (3)$$

where H indicates the Hermitian transpose, and R is the maximum distance of connected neighborhood nodes in the graph. The intuition is that when radar measurements are taken in nearby positions, the measurements should have strong pairwise correlations in the frequency domain.

Let x and x(t) be the denoised frequency-domain signal and time-domain signal, respectively. To denoise radar measurements, we consider a graph-based optimization problem $$\min_{X,T} \frac{1}{2} \|X \odot T - Y\|_F^2 + \frac{\lambda}{2} \|X - \overline{A}X\|_F^2 + \beta \sum_{i=1}^{N} |\nabla_\ell x_i(t)|_\ell \qquad (4)$$

where λ,β are hyperparameters, ⊙ stands for the element-wised product, T=$[e^{-j\omega_k}] \varepsilon \mathcal{C}^{N \times k}$, which compensates the time shift misalignment caused by position perturbations, $\nabla_i x_i$ represents the gradient of the time series $x_i$ associated with the $i^{th}$ node, and $\overline{A}$ is a normalized graph shift matrix whose entries are computed as $\overline{A}_{i,j} = A_{i,j} / \Sigma_j A_{i,j}$. The intuition is to ensure each row of $\overline{A}$ sum up to 1.

Note that the cost function in (4) includes three terms. The first term represents signal fidelity term with the appropriate time shift $t_i$ to compensate the phase misalignment of the $i^{th}$ position perturbation. The second term is the $\ell_2$-norm graph total variation of denoised signal x, which is widely used in the graph signal processing. The graph total variation $$\|X - \overline{A}X\|_F^2 = \sum_i \left\| X_i - \sum_{j \in \mathcal{N}_i} \overline{A}_{i,j} X_j \right\|_2^2$$

compares the difference between the radar measurements associated with each node and the weighted average of its neighbors. Minimizing this term promotes the graph smoothness; that is, neighbouring nodes should share similar radar measurements in the frequency domain. The third term is the $\ell_1$-norm total variation of the time-domain signal $x_i$. It promotes the sparse gradients in the time domain. Overall, we use dual regularization terms to capture the physical properties of radar measurements for target detection.

To solve the optimization problem (4), we alternately update the denoised signal x and the time shift $t_i$ due to position perturbations.

To optimize X, we fix the time shift $t_i$ for i=1, ..., N. According to the signal processing theory, we can rewrite $\nabla_i x_i$ as $$\nabla_i x_i(t) = F^{-1}([j\omega_k] \odot X_i)$$

where $F^{-1}$ is the inverse Fourier transform. We solve x through soft-thresholding the closed-form solution of the two quadratic terms. The denoised signal at the $i^{th}$ node is $$\hat{X}_i = \left[\frac{1}{j\omega_k}\right] \odot F\{S_\beta[F^{-1}([j\omega_k] \odot \tilde{X}_i)]\} \quad (5)$$

where the soft-thresholding operator $S_\beta$ is defined as $$S_\beta(z) = \max(|z|-\beta, 0) z/|z| \quad (6)$$

and $$\tilde{X} = (I + \lambda(I-\overline{A})^T(I-\overline{A}))^{-1}(Y \odot [e^{-jt\omega_k}]). \quad (7)$$

To optimize the time shift $t_i$ for $i=1, \ldots, N$, we fix the estimated signals X as newly updated $\tilde{x}$, i.e., The time shift $t_i$ can be estimated by $$\hat{t}_i = \underset{t}{\operatorname{argmax}} \sum_t [(X_i^H)^T \odot Y_i \odot e^{-jt\omega_k}] \quad (8)$$

which can be implemented by the inverse Fourier transform. Note that Y is noisy and the estimation of $t_i$ is not convex. Therefore, $t_i$ using (8) maybe not accurate. In order to improve the accuracy of the time shift $t_i$, we use cross validation $$t_{i,j} = \underset{t}{\operatorname{argmax}} \sum_t [((X_i \odot e^{-jt_i\omega_k})^H)^T \odot [X_j \odot e^{-jt_j\omega_k}] \odot e^{-jt\omega_k} \quad (9)$$

to form a time shift matrix $\Phi = [t_{i,j}]$, where $t_{i,j}$ represents the time shift between radar signal measured at $i^{th}$ and $j^{th}$ positions due to position perturbations. Let $\varphi = [t_1, t_2, \ldots, t_N]^T$ and $L(\varphi) = \varphi 1^T - 1\varphi^T$. Ideally, we have $t_{i,j} = t_i - t_j$, i.e., $\Phi = L(\varphi)$, where $L(\varphi)$ is a low-rank matrix of rank not great than two. However, due to noisy measurement, the time shift matrix acquired by (9) is not a low rank matrix. Inspired by the robust principal component analysis, we achieve $\varphi$ by decomposing the time shift matrix $\Phi$ into a low-rank matrix and a sparse matrix as follows $$\min_{\varphi, S} \frac{1}{2} \|\Phi - L(\varphi) - S\|_F^2 + \gamma \|\text{vec}\{S\}\|_1. \quad (10)$$

where $\gamma$ is a hyperparameter, and S represents a sparse matrix which absorbs spike errors in the time shift matrix. Similar to (10), the above equation (10) can be solved by a least-squares solution followed by a soft-thresholding process. Once $\varphi$ is achieved by solving (10), the time shift $t_i$ is straightforward according to $\varphi = [t_1, t_2, \ldots, t_N]^T$. The position perturbation at the $i^{th}$ radar position is then estimated by $$|\varepsilon_i| = \frac{t_i c}{2}.$$

Example of Simulation Results

The simulation setup is depicted in FIG. 1B, where we use black dots to indicate ideal moving radar positions, and x-marks to indicate perturbed radar positions. Further FIG. 1C shows comparison between actual perturbed radar positions and estimated positions.

We use a differential Gaussian pulse to illuminate the region of interest (ROI), as indicated by the dashed rectangle, to detect targets represented by four black dots in the ROI. The received signals are simulated using (2) with added white Gaussian noise. FIG. 3A shows the simulated noisy signal whose peak-signal-to-noise ratio (PSNR) is 10 dB.

In our graph-based denoising method, we choose $\lambda = 10^{PSNR/20+1}$, where PSNR is our estimated data peak signal-to-noise ratio in dB, $\beta = 0.15 \max|x(t)|$, and $\gamma = 0.05 \times 10^{-9}$. We present the denoised graph signal using our proposed method in FIG. 3B, from which we see that radar echoes from targets are much clearer than the noisy one. A further quantitative analysis shows that the PSNR is improved from 10 dB to 20.2 dB. With time compensation, the denoised signal are well aligned as shown in FIG. 3C. The corresponding position perturbations are also estimated, and compared with that estimated by coherence analysis, as shown in FIG. 1C. We see that the estimated positions using our proposed method are very well matched with the actual perturbed positions. However, the position estimates based on coherence analysis exhibit large errors. This is because data coherence-based perturbation estimation is not stable due to the noisy data. With the denoised radar signal, we perform radar imaging, with the results shown in FIG. 4B. For comparison, the imaging result based on coherence analysis is shown in FIG. 4C. We see a significant improvement of our method over coherence based method. We have examined our method on other scenarios of different target positions and different perturbed radar positions, all with consistent outperformed results.

Some embodiments of the present disclosure can provide a method to perform a graph-based algorithm to denoise array signals collected by a perturbed synthetic aperture radar. The method performs joint radar signal denoising and radar perturbation estimation by using a dual-regularization-based optimization. Simulation results demonstrated indicates that the method significantly improves the imaging performance for noisy radar measurements of PSNR lower than 10 dB.

Figure 5:
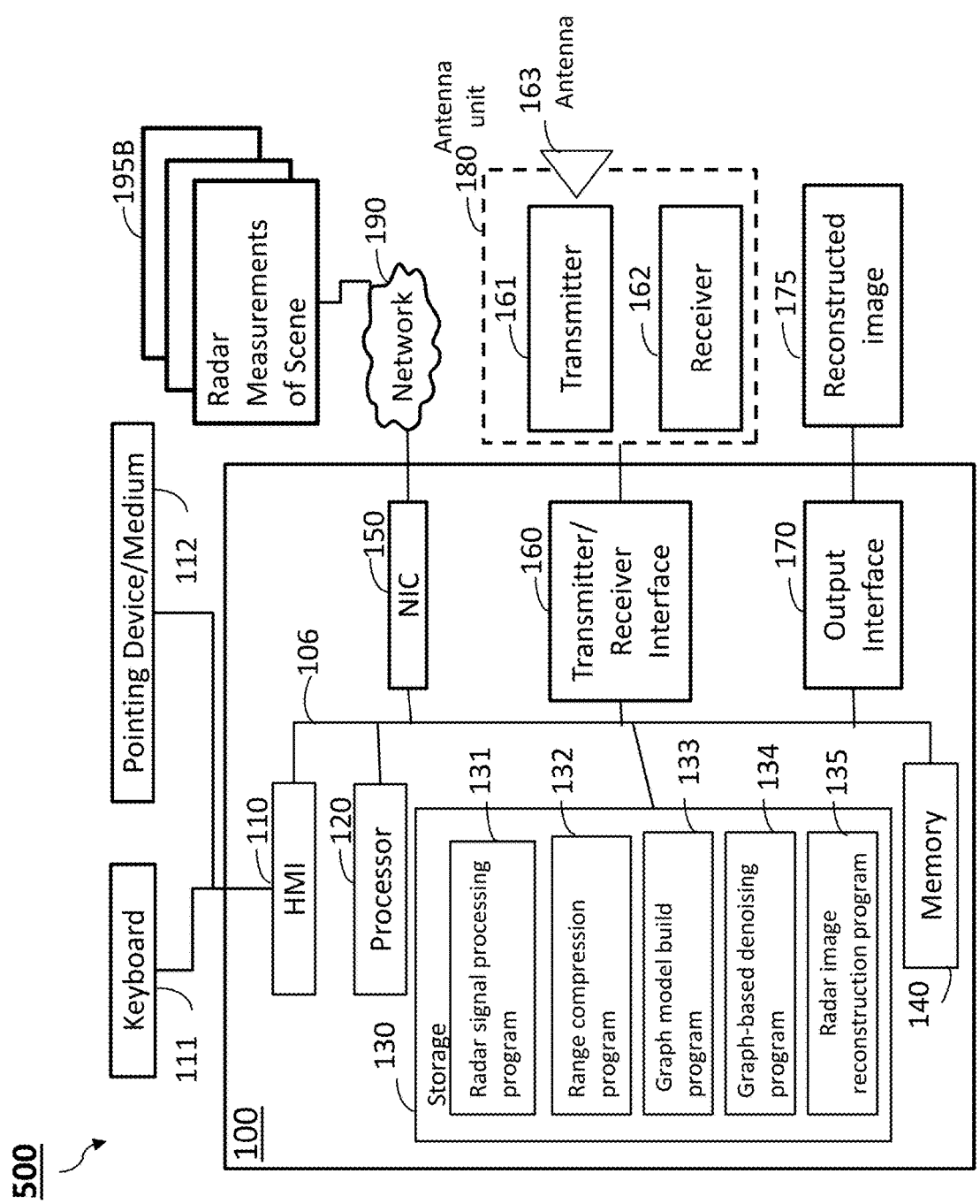
FIG. 5 is a schematic diagram illustrating a radar system 100 for generating a radar image from a region of interest (ROI), according to embodiments of the present disclosure.

FIG. 5 is a schematic diagram illustrating a radar system 500 for generating a radar image from a region of interest, according to embodiments of the present disclosure. The radar system 500 can be installed/arranged on vehicles. The vehicles can be automobiles such as trucks, motor cycles or the like. The radar system 500 may be referred to as a moving radar platform when the radar system is arranged on automobiles.

The radar system 500 may include a network interface controller (interface) 150 configured to receive radar measurements (radar measurement data) 195B from a radar measurement device (not shown) via a network 190. The radar measurements 195B are signals indicating objects at a region of interest (ROI), including echoes reflected from the ROI. In this case, each pulse and each echo include information of a perturbed radar platform position.

Further, the radar system 500 may include a memory 140 to store computer-executable programs used in the radar imaging method 200 in a storage 130. The computer-executable programs/algorithms may be a radar signal processing program 131, a graph model construction program 133, a range compression program 132, a graph-based denoising program 134, an image construction program 135, and a processor 120 (or more than one processor) configured to the computer-executable programs in connection with the memory 140 that accesses the storage 130 to load the computer-executable programs. Further, the processor 120 is configured to receive the radar measurements (data) of scene 195 from the radar measurement device via a network 190 and perform the radar imaging method 200 discussed above. The radar system 500 can further include a human machine interface (HMI) 110, a transmitter/receiver interface 160 and output interface 170. The HMI 110 can be connected to a keyboard, a pointing device/medium 112 or the like to receive instruction commands from an operator to start or stop the radar imaging process. The transmitter/receiver interface 160 can be connected to an antenna unit 180 that includes a transmitter 161, a receiver 162 and an antenna 163. The radar system 500 can transmit reconstructed image(s) 175 generated by the processer 120 to a display device (not shown) via the output interface 170. In some embodiments, the NIC may be configured to include the HMI 110, the transmitter/receiver interface 160 and the output 170 as an integrated interface.

According to another embodiment of the present disclosure, a radar image processing device 100 can be provided for generating a radar image from a region of interest (ROI). The radar image processing device 100 can be constructed by including a network interface controller (NIC) 150 configured to receive transmitted radar pulses and radar echoes reflected from the ROI in response to the transmitted radar pulses at different positions along a path of a moving radar platform, a memory 140 configured to store computer-executable programs (the radar imaging method 200) including a range compressor 132, a graph modeling generator 133, a signal aligner and a radar imaging generator and a focused image generator, a processor 120, in connection with the memory 140. The processor 120 is configured to perform range compression on the radar echoes by deconvolving the transmitted radar pulses and perform a radar measurement to obtain frequency-domain signals Y(i,k), generate a graph model represented by sequential positions of the moving radar platform and a graph shift matrix A computed using the frequency-domain signals Y(i,k), iteratively align and denoise the frequency-domain signals Y(i,k) to obtained denoised data X(i,k) and time shifts t by solving a graph-based optimization problem represented by the graph model, wherein the approximated time shifts t compensate phase errors caused by position perturbations of the moving radar platform, and perform radar imaging based on the denoised data X(i,k) and the estimated time shifts t to generate focused radar images. The radar image processing device 100 can reconstruct radar images by receiving radar measurements (data) of scene 195B via the NIC 150 so that the radar image processing device 100 reconstruct radar imaged from the receiving radar measurements (data) of scene 195B.

Further, the radar system 500 may include at least one antenna that is arranged toward an advancing side of the moving radar platform, and the at least one antenna may transmit the generated focus radar images to a display device via the interface.

In some cases, the graph-based optimization problem imposes smoothness of X(i,k) in the frequency domain and sparsity of x(t) in the time domain. Further, the time shifts may be cross-validated by decomposing a time shift matrix into a sparse matrix and a low-rank matrix. Also, the time shifts are configured to compensate phase errors caused by position perturbations of the moving radar platform.

In some cases, the radar image processing device 100 can be a standalone device that can compute and output radar reconstructed image by receiving the radar measurements which include the information required to reconstruct radar images the processer 120 can receive the radar measurements via the NIC150 in connection with the network 190.

The radar measurements 195B include pulse signals indicating objects in the ROI and echoes reflected from the ROI. In this case, each of the pulse signals and each of the echoes include information of perturbed positions of the radar system.

In some embodiments, a method for denoising radar measurements of scenes can be provided. The method may include steps of generating a graph model represented by sequential positions of a moving radar platform and a graph shift matrix A computed using frequency-domain signals Y(i,k), and iteratively denoising and aligning the frequency-domain signals Y(i,k) to obtain denoised data X(i,k) and time shifts $t_i$ by solving a graph-based optimization problem represented by the graph model, wherein the time shifts are configured to compensate phase misalignments of positions of the moving radar platform. In some cases, the method may be a computer-executable program that causes a process to perform the steps of the method, and the computer-executable program can be stored into at least one memory or at storage device.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A radar system for generating a radar image from a region of interest (ROI) comprising:
    an interface configured to transmit radar pulses to the ROI at different positions along a path of a moving radar platform and receive radar echoes reflected from the ROI, wherein the at least one antenna is arranged on the moving platform to emit radar pulses to the ROI using at least one antenna;

a memory configured to store computer-executable programs including a range compressor, a graph modeling generator, a signal aligner and a radar imaging generator and a focused image generator;

a processor, in connection with the memory, configured to:

perform range compression on the radar echoes by deconvolving the transmitted radar pulses and perform a radar measurement to obtain frequency-domain signals Y(i,k);

generate a graph model represented by nodes corresponding to sequential positions of the moving radar platform and a weighted adjacency matrix A representing pairwise proximity between the nodes and the frequency-domain signals Y(i,k);

iteratively denoise and align the frequency-domain signals Y(i,k) to obtain denoised data X(i,k) and time shifts $t_i$ by solving a graph-based optimization problem represented by the graph model; and perform radar imaging based on the denoised data X(i,k) and the time shifts $t_i$ to generate focused radar images.

2. The radar system of claim 1, wherein the radar echoes include position perturbations with respect to the moving radar platform.

3. The radar system of claim 1, wherein the processer is configured to receive the radar measurements, wherein the radar measurements include pulse signals indicating objects in the ROI and echoes reflected from the ROI.

4. The radar system of claim 3, wherein each of the pulse signals and each of the echoes include information of perturbed positions of the radar system.

5. The radar system of claim 1, wherein the at least one antenna is arranged on a side of the moving radar platform to detect at angles the radar echoes from the ROI.

6. The radar system of claim 1, wherein the at least one antenna transmits the generated focus radar images to a display device via the interface.

7. The radar system of claim 1, wherein the graph-based optimization problem imposes smoothness of X(i,k) in the frequency domain and sparsity of x(t) in the time domain.

8. The radar system of claim 1, wherein the time shifts are cross-validated by decomposing a time shift matrix into a sparse matrix and a low-rank matrix.

9. The radar system of claim 8, wherein the sparse matrix is a function of time shifts.

10. The radar system of claim 1, wherein the time shifts are configured to compensate phase errors caused by position perturbations of the moving radar platform.

11. A radar image processing device for generating a radar image from a region of interest (ROI) comprising:

a network interface controller (NIC) configured to receive transmitted radar pulses and radar echoes reflected from the ROI in response to the transmitted radar pulses at different positions along a path of a moving radar platform;

a memory configured to store computer-executable programs including a range compressor, a graph modeling generator, a signal aligner and a radar imaging generator and a focused image generator;

a processor, in connection with the memory, configured to:

perform range compression on the radar echoes by deconvolving the transmitted radar pulses and perform a radar measurement to obtain frequency-domain signals Y(i,k);

generate a graph model represented by nodes corresponding to sequential positions of the moving radar platform and a weighted adjacency matrix A representing pairwise proximity between the nodes and the frequency-domain signals Y(i,k);

iteratively denoise and align the frequency-domain signals Y(i,k) to obtain denoised data X(i,k) and time shifts $t_i$ by solving a graph-based optimization problem represented by the graph model, wherein the time shifts are configured to compensate phase misalignments of positions of the moving radar platform; and perform radar imaging based on the denoised data X(i,k) and the estimated time shifts $t_i$ to generate focused radar images.

12. The radar imaging device of claim 11, wherein the moving radar platform emits radar pulses to the ROI using at least one antenna.

13. The radar imaging device of claim 12, wherein the radar imaging device is arranged on a side of the moving radar platform to detect at angles the radar echoes from the ROI.

14. The radar imaging device of claim 11, wherein the radar imaging device transmits the generated focus radar images to a display device via the NIC.

15. The radar imaging device of claim 11, wherein the radar echoes include position perturbations with respect to the moving radar platform.

16. The radar imaging device of claim 11, wherein a time-domain signal $y(r_i,t)$ is used instead of frequency-domain signals Y(i,k).

17. The radar imaging device of claim 11, wherein the graph-based optimization problem imposes smoothness of X(i,k) in the frequency domain and sparsity of x(t) in the time domain.

18. The radar imaging device of claim 11, wherein the time shifts are cross-validated by decomposing a time shift matrix into a sparse matrix and a low-rank matrix.

19. The radar imaging device of claim 11, wherein the time shifts are configured to compensate phase errors caused by position perturbations of the moving radar platform.

20. A method for denoising radar measurements of scenes, comprising steps of:

receiving radar echoes reflected from a region of interest (ROI) using at least one antenna arranged on a moving radar platform configured to emit radar pulses to the ROI using the at least one antenna;

generating a graph model represented by nodes corresponding to sequential positions of the moving radar platform and a weighted adjacency matrix A representing pairwise proximity between the nodes and the frequency-domain signals Y(i,k); and iteratively denoising and aligning the frequency-domain signals Y(I,k) to obtain denoised data X(I,k) and time shifts ti by solving a graph-based optimization problem represented by the graph model, wherein the time shifts are configured to compensate phase misalignments of positions of the moving radar platform.

* * * * *